Sept. 2, 1941.  F. JUDGE ET AL  2,254,947
VEHICLE SUNSHADE
Filed May 18, 1940

Fletcher Judge
Cornelius A. Donovan
INVENTOR.

BY
ATTORNEY.

Patented Sept. 2, 1941

2,254,947

UNITED STATES PATENT OFFICE 2,254,947

VEHICLE SUNSHADE

Fletcher Judge and Cornelius Albert Donovan, Dallas, Tex., assignors to Auto Venette Company Incorporated, Dallas, Tex., a corporation of Texas Application May 18, 1940, Serial No. 335,906

2 Claims. (Cl. 189—63)

This invention relates to sun shades for automobile windows and it has particular reference to shades especially suited for the rear windows of vehicles.

The principal object of the invention is to provide a sun shade, preferably of the Venetian type so designed that it will remain firmly and, if desired, permanently in position in a window without screws, bolts or other means requiring the drilling of holes or otherwise affecting any part of the vehicle to effect installation of the shade.

Another object of the invention is to provide a sun shade whose principal parts may be constructed of wood or plastic and associated with other parts to produce a device, compact in design, pleasing in appearance and which will obstruct the sun's rays without materially interfering with the vision through the window over which it is mounted.

With the foregoing objects as paramount, the invention has particular reference to its salient features of construction and arrangement of parts which will become manifest as the description proceeds, taken in connection with the accompanying drawing, wherein—

Figures 1, 4:
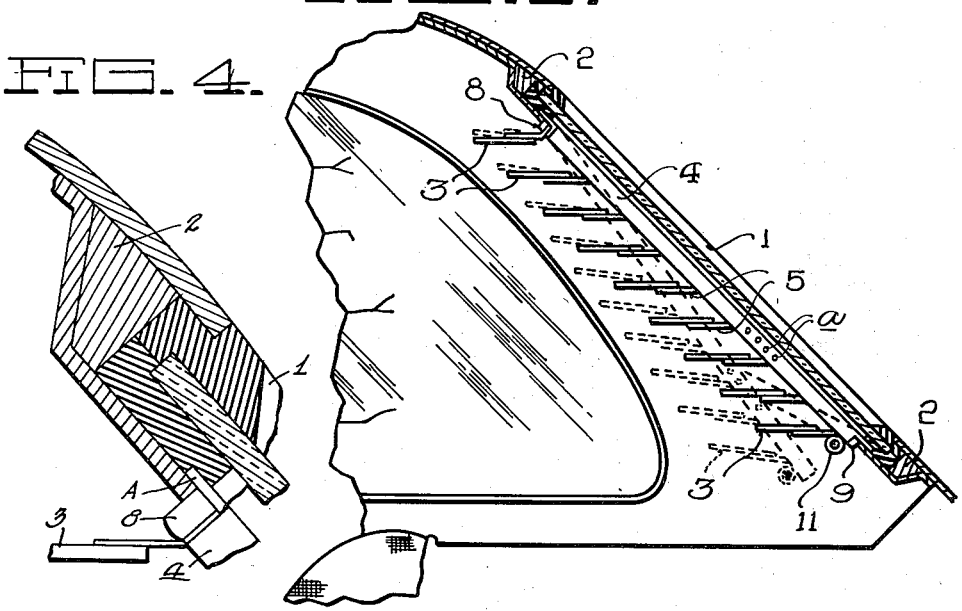
Figure 1 is a fragmentary view of a rear portion of a vehicle, showing the invention mounted over a window and illustrating in dotted lines the position thereof preparatory to urging the same into fixed position.
Figure 4 is a fragmentary sectional view of the upper end of the shade showing the manner of securement.
Figure 2:
Figure 2 is a front view.

Continuing with a more detailed description of the drawing, 1 denotes the rear window of a closed type of automobile and 2, the frame thereof. It is well known that the present design of a vehicle body provides that the top converge into the back on a slope which allows the sun's rays to enter the car throughout the day to the discomfort of the occupants and also tends to discolor the upholstery. The invention eliminates these disadvantages, yet does not interfere with the vision through the window by so arranging the slats 3 that their faces will lie in a horizontal plane, vertically spaced apart to allow vision between them, yet will obstruct the rays of the sun except in some positions mornings and evenings. During these times, however, the rays are not usually severe.

The slats 3 are held in the position stated by supporting bars or ribs 4, which latter are, in the present case, constructed of channels, punched out to define tabs 5 on which the slats are riveted, welded or otherwise suitably secured.

The means by which the shade is retained in the opening is comprised of links or arms 6 of the same cross-sectional shape as but smaller than the supports 4 and are pivoted on removable pins 7 in confronting relation to the said supports whereby to lie within the channels thereof when in relative operative position. Where the window openings vary in height, the pivot pin 7 may be removed and replaced in other aligned apertures $a$ to elongate the supports 4 through this adjustment with the link 6.

Disposed at the upper ends of supports 4 are extensions A, adjacent which are resilient pads 8 of rubber or like material. Analogous pads 9 are similarly provided at the lower ends of the links 6 and which latter are likewise provided with extensions B. When the shade is in place in an opening, as shown in solid lines in Figure 1 with the extensions A and B inserted between the molding and weather-stripping of window, these resilient pads are compressed and serve the dual purpose of firmly holding the shade in position as well as protecting the finish of the surface against which the retaining parts of the assembly bear.

Figures 3, 5:
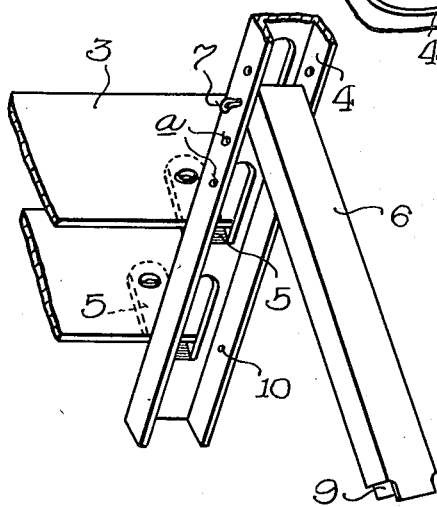
Figure 3 is a fragmentary perspective view showing the retaining link.
Figure 5 is a view similar to Figure 4 but showing attachment of the bottom of the shade.

In installing the shade, the upper ends of the supports 4 are so placed that the rubber pads 8 will bear against the top of the frame 2 while the links 6 are disposed in the position shown in dotted lines in Figure 1 or as shown in Figure 3, so that their pads 9 will engage the lower portion of the frame with extensions A and B in position to be pressed to a sufficient depth between the molding and weather-stripping to firmly hold the supports. The supports 4 are then urged inwardly near the bottom to put the supports and links under compression when the latter are relatively parallel. Also, when in this position, small protuberances 10 (Figure 3) extending inwardly from the flanges of the supports 4, bear frictionally against the sides of the links, thus affording further assurance against accidental dislodgment of the shade.

The shade thus installed will remain in position indefinitely and there are no screws or loose parts to rattle or produce noises. Rings 11 are provided on the supports 4 as a convenience in removing the shade from an opening.

It is apparent that the structure described may be installed in openings other than the rear window of an automobile with little, if any, alteration. Moreover, such variations in construction such as adjustability of the slats, modification of the connection between the link 6 and supports 4 and other minor alterations may be made as will fall within the scope and meaning of the appended claims without departing from the spirit and intent of the invention.

What is claimed is:

1. A shade for windows and other openings including a plurality of relatively parallel slats mounted on relatively spaced supports, links pivoted to said supports, compressible means carried by the ends of said supports and the free ends of said links to bear against opposite sides of an opening whereby to maintain said supports and links under compression when in relatively parallel relationship.

2. A shade for windows and other openings including parallel supports having slats connected to and extending thereacross, links pivotally connected to said supports, resilient pads carried by said supports at one of their ends and by the free ends of said links and adapted to bear against opposite sides of an opening when said supports and links are compressedly retained in relatively parallel relationship in said opening.

FLETCHER JUDGE.
C. ALBERT DONOVAN.